(12) United States Patent  (10) Patent No.: US 8,330,114 B2
Mihailescu et al.  (45) Date of Patent: *Dec. 11, 2012

(54) SYSTEMS FOR INCREASING THE SENSITIVITY OF GAMMA-RAY IMAGERS

(75) Inventors: Lucian Mihailescu, Pleasanton, CA (US); Kai M. Vetter, Alameda, CA (US); Daniel H. Chivers, Fremont, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/349,520

(22) Filed: Jan. 12, 2012

(65) Prior Publication Data

US 2012/0112080 A1 May 10, 2012

Related U.S. Application Data

(63) Continuation of application No. 11/607,554, filed on Nov. 30, 2006, now Pat. No. 8,110,810.

(60) Provisional application No. 60/755,469, filed on Dec. 29, 2005.

(51) Int. Cl.
*G01T 1/24* (2006.01)
(52) U.S. Cl. .................................................. 250/370.1
(58) Field of Classification Search ............... 250/370.1
See application file for complete search history.

(56) References Cited

U.S. PATENT DOCUMENTS

2001/0025928 A1 10/2001 Lingren et al.
2005/0139775 A1 6/2005 Gono et al.

OTHER PUBLICATIONS

Mihailescu, L, Vetter, K M, Burks, M T, Hull, E L, and Craig W W, "SPEIR: AGe Compton Camera." OSTI Report UCRL-TR 202620, published Feb. 11, 2004, <doi:10.2172/15013886>.

*Primary Examiner* — Constantine Hannaher
(74) *Attorney, Agent, or Firm* — John P. Wooldridge

(57) ABSTRACT

Systems that increase the position resolution and granularity of double sided segmented semiconductor detectors are provided. These systems increase the imaging resolution capability of such detectors, either used as Compton cameras, or as position sensitive radiation detectors in imagers such as SPECT, PET, coded apertures, multi-pinhole imagers, or other spatial or temporal modulated imagers.

16 Claims, 12 Drawing Sheets

SYSTEMS FOR INCREASING THE SENSITIVITY OF GAMMA-RAY IMAGERS

This application is a continuation of US. patent application Ser. No. 11/607,554, titled "Methods for Increasing the Sensitivity of Gamma-Ray Imagers," filed Nov. 30, 2006, incorporated herein by reference, which claims priority to U.S. Provisional Patent Application Serial No. 60/755,469, titled: "Methods for Increasing Sensitivity of Gamma-Rav Imagers" filed Dec. 29, 2005, incorporated herein by reference.

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

1. Field of the Invention

The present invention relates to gamma ray imaging, and more specifically, it relates to improving the gamma ray imaging efficiency and accuracy of semiconductor detectors.

2. Description of Related Art

Most gamma-ray imaging systems use position sensitive scintillators. A scintillator is a device or substance that absorbs high energy (ionizing) electromagnetic or charged particle radiation then, in response, fluoresces photons at a characteristic Stokes-shifted (longer) wavelength, releasing the previously absorbed energy. Such scintillators have good efficiency, but they lack good energy resolution, and their position resolution decreases significantly with increasing the energy of the radiation. Semiconductor detectors have the capability to provide good efficiency and position resolution, but also good energy resolution and granularity. All these features are of interest for collimator based imagers, but especially for Compton imagers. In fact the introduction of position sensitive semiconductor detectors helped revitalize the Compton scatter camera concept in the last few years. Several Compton camera devices based on CdZnTe, high purity Germanium and Silicon detectors are under development targeting applications in astrophysics, bio-medical research and homeland security. Some of these systems provide images having good resolution, but most have very low efficiency. The reason for the low efficiency is that only a fraction of the total detected photons are found suitable for Compton imaging. To obtain reasonable resolution, the average distance between the interactions must be large as compared with the position uncertainty of individual interactions, so that only events with widely separated and clean interactions can be used for imaging. Improved efficiency must be demonstrated for a Compton scatter camera to become a competitive gamma-ray imaging method.

SUMMARY OF THE INVENTION

It is an object of the present invention to provide systems that improve imaging efficiency and accuracy of semiconductor detectors.

It is another object to provide systems that increase the number and accuracy of events that can be imaged in Compton cameras.

Still another object of the invention is to increase the number and accuracy of events that can be imaged in collimator based imagers.

Another object is to provide position interpolation systems for determining the position resolution in a segmented detector.

Another object is to provide systems that increase the granularity of a detection system by discriminating multiple interactions taking place in adjacent segments from single interactions that induce signals in two adjacent segments.

These and other objects will be apparent based on the disclosure herein.

There are four main factors that affect the imaging efficiency of Compton imagers: the detection quantum efficiency, the detection granularity, the position resolution and the energy resolution for each interaction. Improvement in detection quantum efficiency can be obtained by optimizing the detection geometry and scaling up the imaging system. The methods of the present invention, however, mainly address position resolution and detection granularity. In the case of most segmented detectors, the position resolution is determined by the detection granularity alone. As shown below, however, position resolution can be improved by using position interpolation methods. Further, system granularity can be improved by discriminating multiple interactions taking place in adjacent segments from single interactions that induce signals in two adjacent segments. This will increase the reliability of the detected photons for Compton imaging as well as for other collimator based imagers.

The developed methods can be used to analyze data collected from double sided segmented detectors (DSSDs) and pixilated semiconductor detectors, such as Si(Li), Ge and CdZnTe. The methods will increase the image resolution and sensitivity of gamma-ray imaging systems used for DHS, DOE and DOD applications. Gamma-ray imagers are important in surveillance, monitoring, diagnostics and search applications.

A Compton camera using the invented methods will have potential use in medical imaging and industry in a collimatorless imager. Apparatuses that carry our such methods will enable semiconductor detectors of increased interest as high efficiency, high-resolution imagers in spatial or temporal modulated imagers. PET and SPECT imagers as well as other radiographic systems will be prime candidates.

BRIEF DESCRIPTION OF THE DRAWINGS

The accompanying drawings illustrate embodiments of the invention and, together with the description, serve to explain the principles of the invention.

DETAILED DESCRIPTION OF THE INVENTION

Utilization of gamma-ray events with closely spaced interactions requires maximum detector granularity and position resolution. Despite a segment pitch size of at least 2 mm, position resolutions in the sub-millimeter range are obtained by using new waveform filtering methods of the present invention. By analyzing the induced signals in adjacent segments of a segmented detector, the position of the interaction within the segment width can be inferred. The depth of interaction is determined (within 0.5 mm in one embodiment) by measuring the difference in the arrival time of the electrons and holes to the opposite electrodes. The best position resolution achievable with Ge detectors is ultimately limited by the path length of the electrons produced in Compton or photoelectric interactions and the subsequent diffusion of the charge carriers in the crystal. The reconstruction of gamma-ray interactions implies the determination of the number of interactions in the active volume of the imager, as well as their energies and three-dimensional positions.

Figure 1:
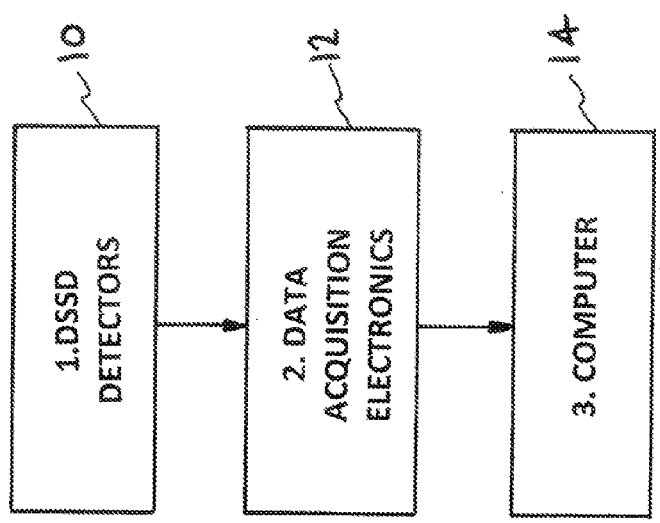
FIG. 1 is a chart showing the data flow between hardware components.

FIGS. 1-4 provide a general description of the invention. FIG. 1 shows the data flow between hardware components of an exemplary embodiment. At least one double-sided segmented detector (DSSD) 10 is provided for detection of gamma rays. The DSSD is connected to and in communication with data acquisition electronics 12, which at least contain preamplifiers for each channel, analog-to-digital converters and fast processing electronics (FPGA and/or digital signal processing (DSP)). The data acquisition electronics 12 are in communication with a computer 14. The algorithms presented in this disclosure may be implemented in the data acquisition electronics 12 and/or the computer 14.

Figure 2:
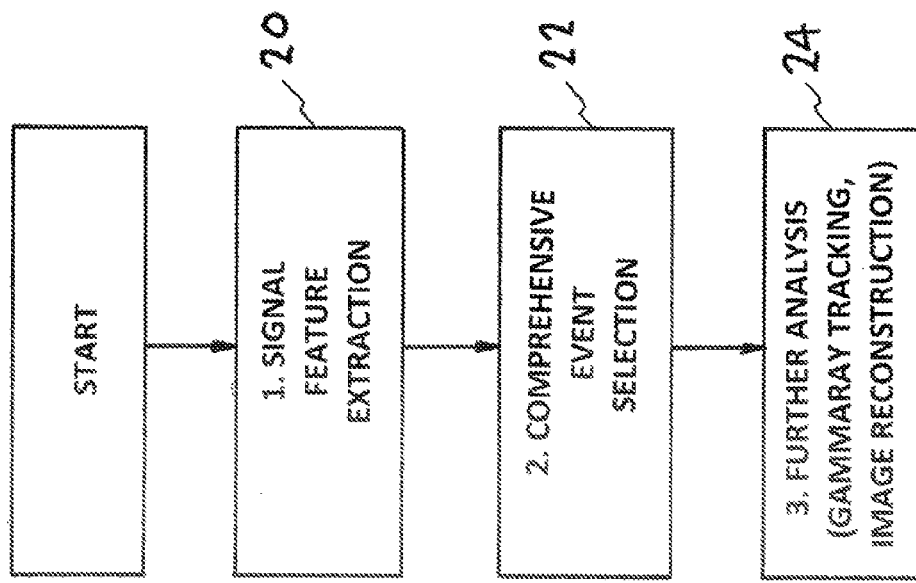
FIG. 2 shows an embodiment of the analysis methods.

FIG. 2 is a chart of the main analysis methods groups. Signal feature extraction methods 20 contain filters applied on the digitized signals that extract parameters required for the next analysis step, referred to as Comprehensive Event Selection 22. This group (22) of methods contains algorithms used to determine energies and positions of gamma-ray interactions. Gamma-ray interactions can be Compton scatterings, photoelectric absorptions or pair-productions. The Further Analysis methods 24 use the list of interactions to create gamma-ray images.

Figure 3:
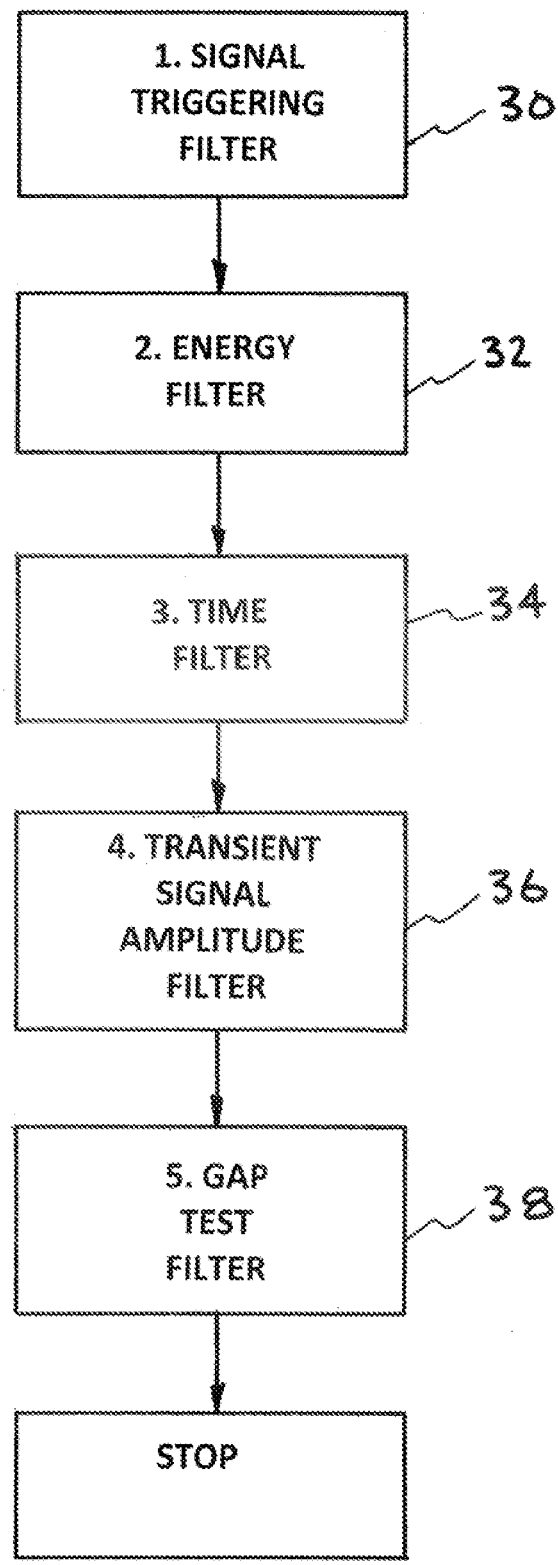
FIG. 3 lists the methods that are part of the Signal Feature Extraction group.

FIG. 3 shows a Signal Feature Extraction 20 group of methods. Signal triggering filter 30 determines the channels that have collected charge carriers, electrons or holes. The "triggered channels" are also called "firing channels." Energy filter 32 determines the energy deposited in each firing channel. Time filter 34 determines the approximate time at which the charge carriers arrive at the detector electrode for each firing segment. A T50 timing filter (discussed below) can be used. Transient signal amplitude filter 36 calculates the signal amplitudes in the channels adjacent to the triggered ones. GapTest filter 38 is used obtains data for later use in the GapTest if adjacent channels are triggered.

Figure 4:
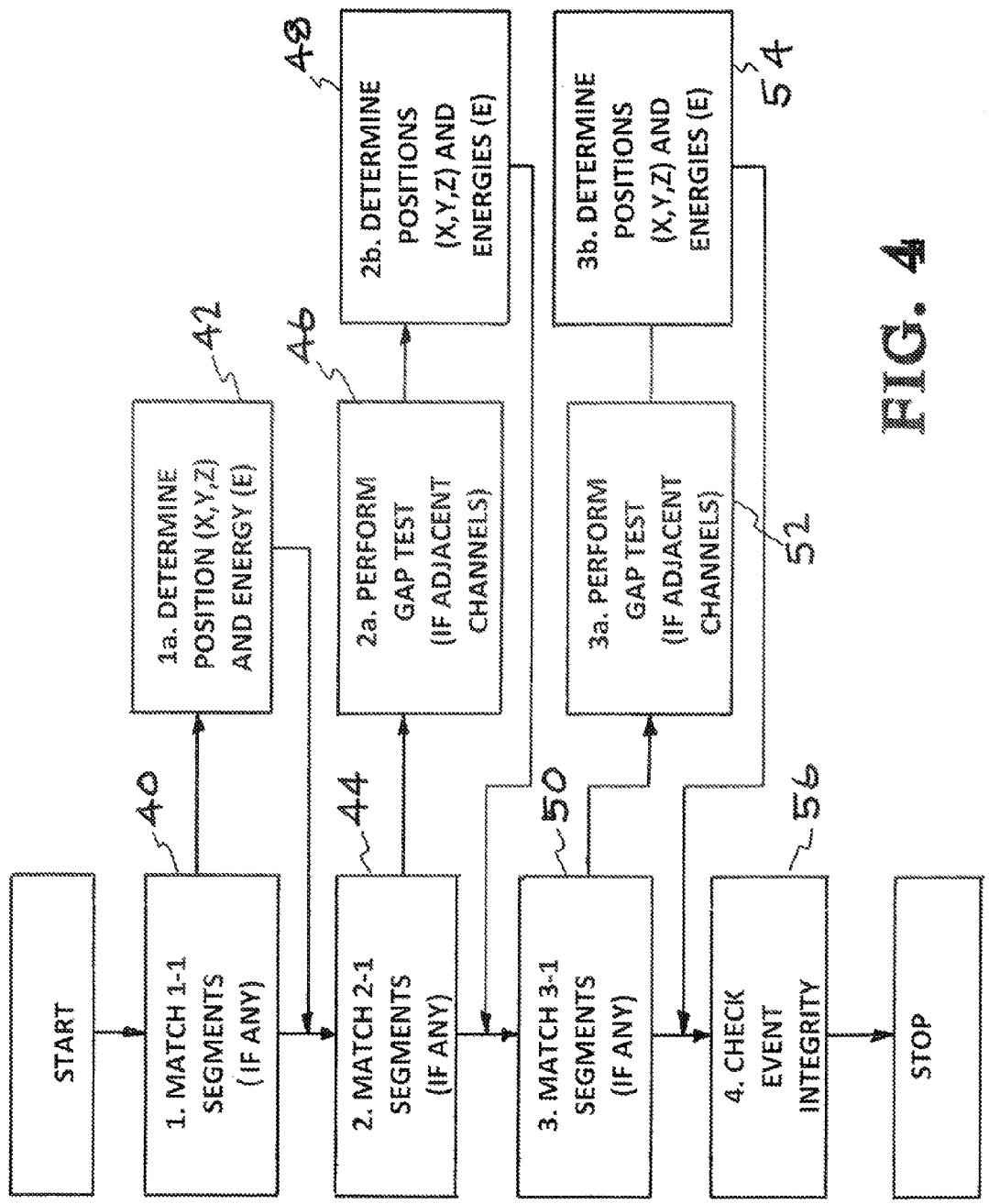
FIG. 4 is a flowchart of the Comprehensive Event Selection method.

FIG. 4 is a flowchart of Comprehensive Event Selection methods 22. Block 40 shows energy matching of "1-1" firing segments, if any. Block 42 shows the use of z-and x-y-interpolation algorithms to determine the position of the interaction. Block 44 shows energy matching of "2-1" firing segments, if any are possible. Block 46 shows that if the two firing segments on one side are adjacent, GapTest is performed. Block 48 shows the use of z-and x-y-interpolation algorithms to determine the position of the two interactions; if the GapTest was positive, use the z-and x-y-interpolation algorithms to determine the position of a single interaction. Block 50 shows the step of energy matching of "3-1" trigger segments, if any are possible. Block 52 shows that if the two firing segments of Block 50 on one side are adjacent, GapTest is performed. Block 54 shows the use of z-and y-interpolation algorithms to determine the position of the two interactions of Block 50; if the GapTest was positive, use the z-and x-y-interpolation algorithms to determine the position of a single interaction. Block 56 checks event integrity. This verifies that the sum of the energies of all identified interactions is consistent with the total energy deposited in the detectors.

Figure 5:
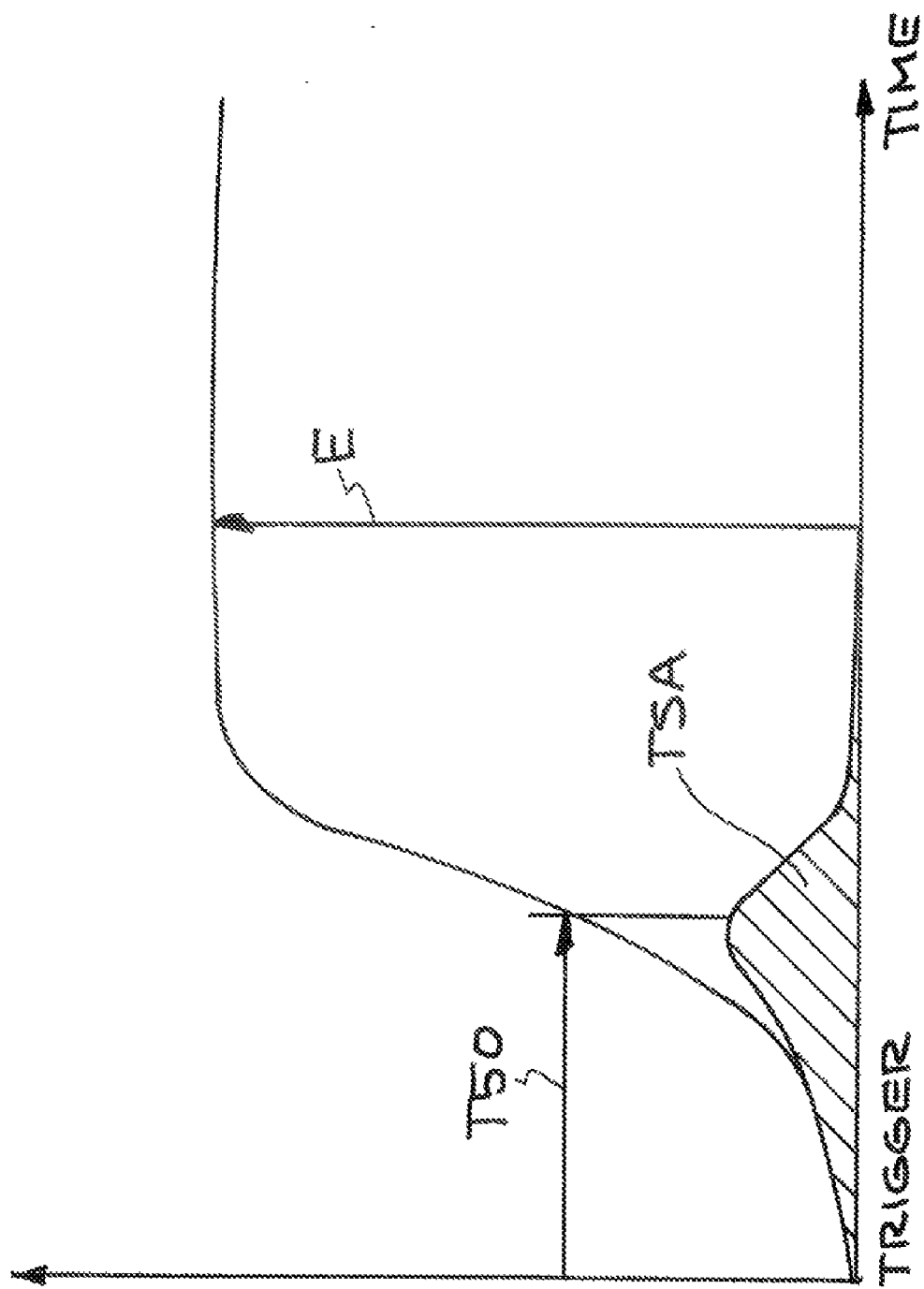
FIG. 5 is a graphical representation of the main parameters used in event selection wherein E is Energy, T50 is 50% threshold timing and TSA is transient signal amplitude.
Figure 8A:
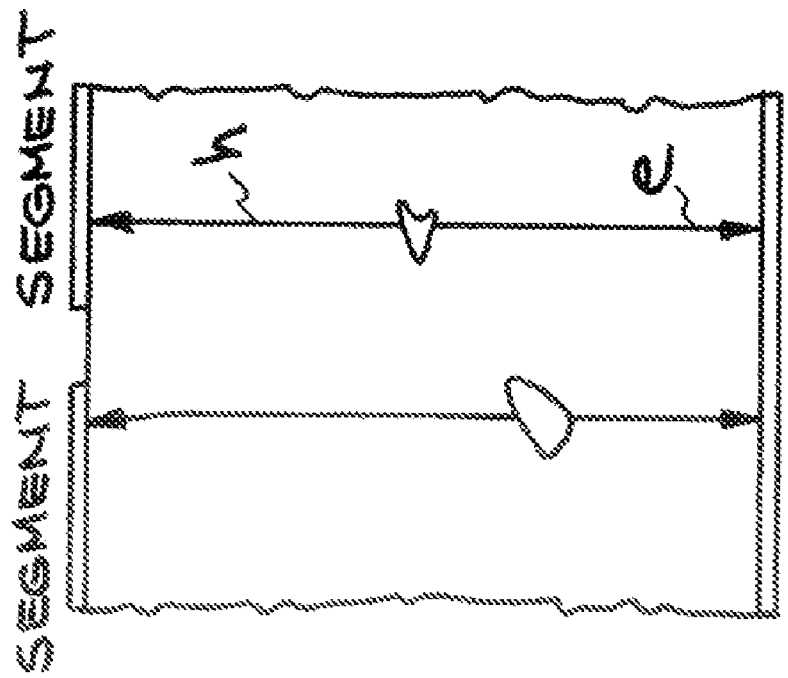
FIG. 8A shows charge carriers produced in a interaction taking place under the border being collected by two adjacent segments.
Figure 8B:
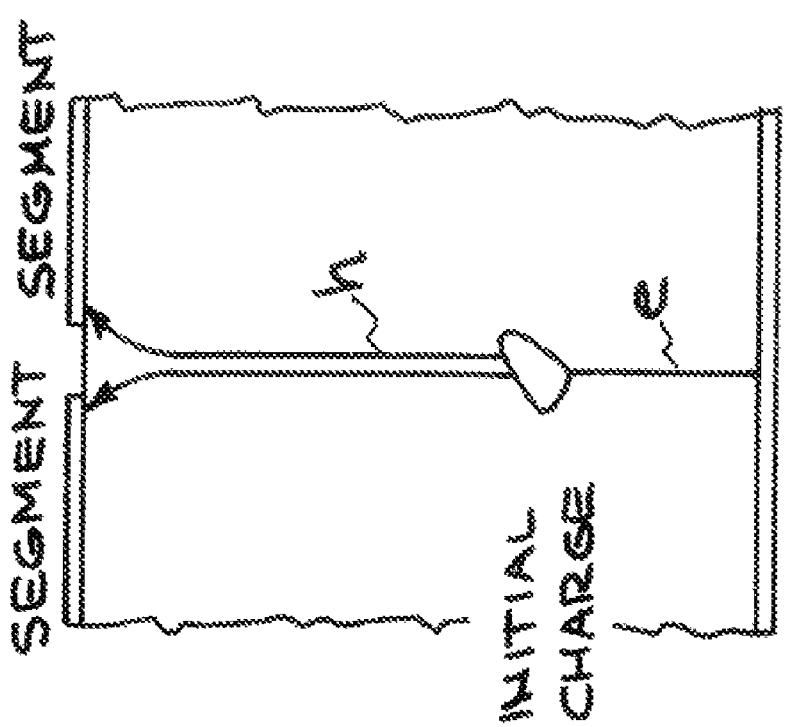
FIG. 8B shows two adjacent segments collecting charge carriers from two separate interactions.
Figure 9:
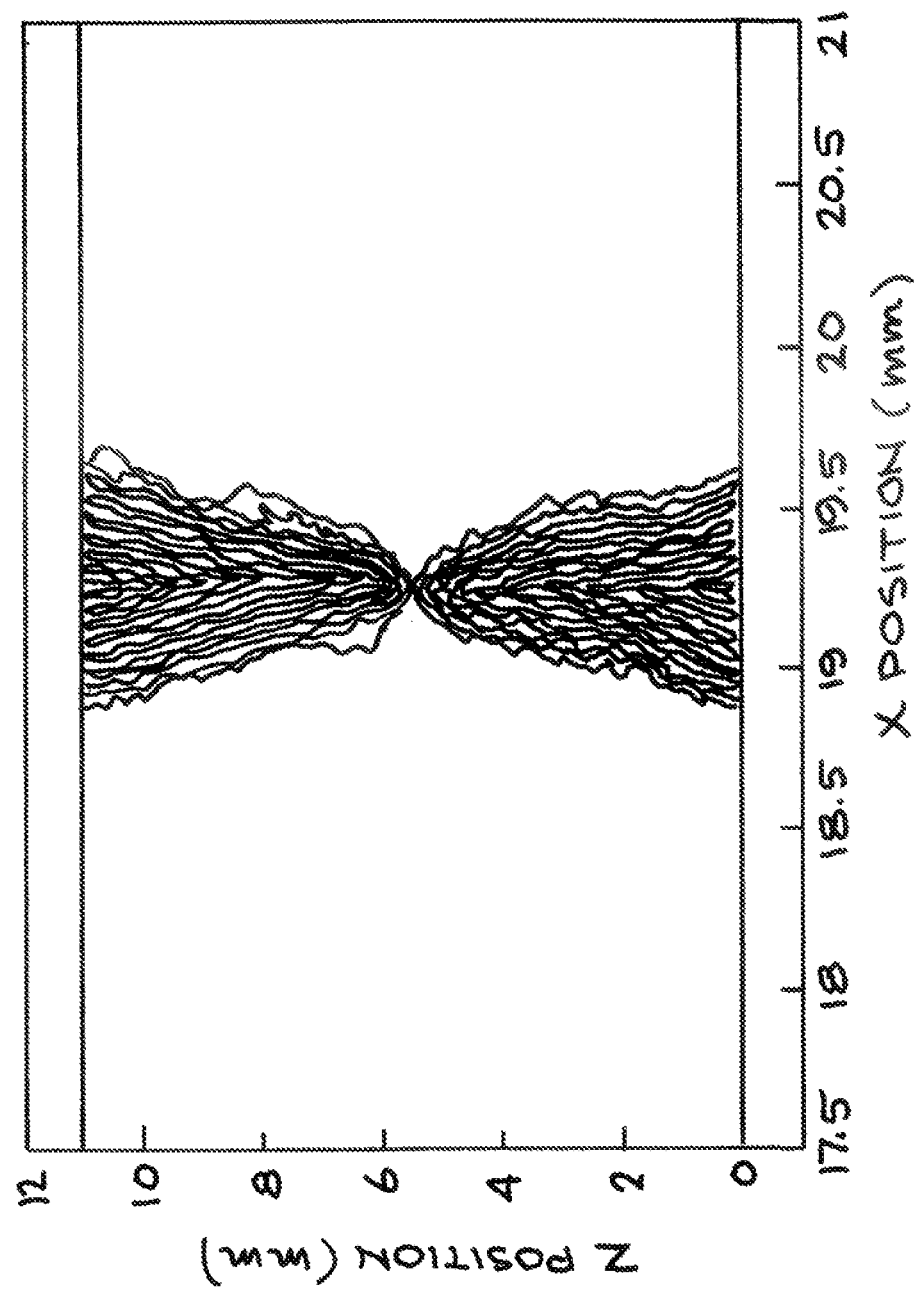
FIG. 9 shows the simulation of charge carrier drift and diffusion where all electrons and holes were generated at the same point.
Figure 11:
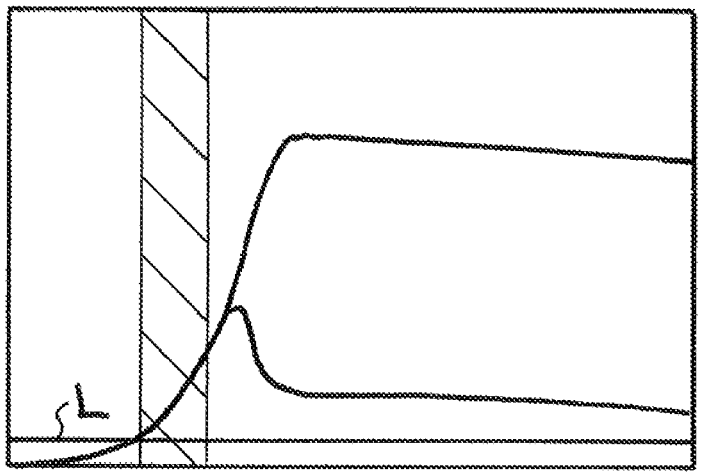
FIG. 11 shows signals induced in a charge sharing interaction taking place away from the collecting electrode.

FIG. 5 is a graphical representation of the main parameters used in event selection wherein E is Energy, T50 is 50% threshold timing and TSA is transient signal amplitude. FIG. 8A shows charge carriers produced in an interaction taking place under the border being collected by two adjacent segments. FIG. 8B shows two adjacent segments collecting charge carriers from two separate interactions. FIG. 9 shows the simulation of charge carrier drift and diffusion where all electrons and holes were generated at the same point. FIG. 11 shows signals induced in a charge sharing interaction taking place away from the collecting electrode.

A so-called Comprehensive Event Selection algorithm is used to match (compare) the information from firing segments in a Double-Sided Segmented Detector (DSSD). The result of this algorithm is a list of interactions taking place in the detector for each detected photon. The parameters associated with each identified interaction are: energy, 3D position, detector identifier (in a system of multiple detectors), and confidence level. For each event consisting of one or more interactions, the algorithm will deliver a figure-of-merit (FoM_CES) labeling the result of the algorithm. A figure-of-merit between 0 and 1 will be attached to accepted events. Its value will be proportional with the confidence level for the event as a whole. A figure-of-merit outside [0, 1] will label an event which has firing segments that can not be properly matched. In this case, the FoM_CES value will code the reason for the mismatch. Such an event is discarded for imaging purposes.

Figure 6:
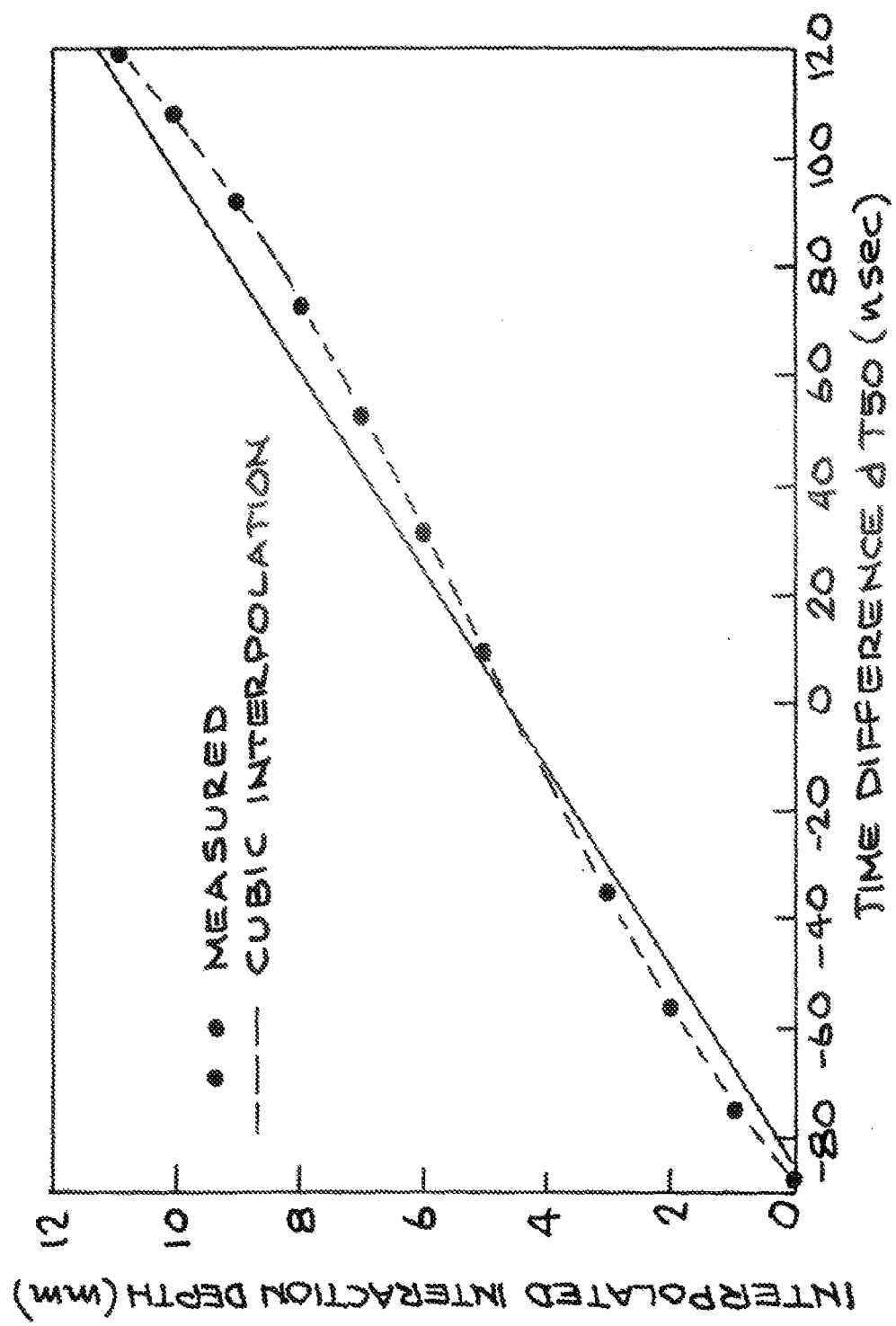
FIG. 6 shows the calibration of depth interpolation with a planar Ge detector.

The algorithm uses as input a list of firing segment parameters. The parameters associated to the firing segments are obtained in a previous step in the data acquisition system (see FIGS. 3, 5 and 6). For each firing segment, the parameters provided are E, T50, R and gapTest, where E [keV] is the deposited energy, T50 [ns] is the time when the pulse reaches 50% of its total amplitude, R is the ratio of the transient signal amplitudes (TSA) of the two adjacent segments (described below), and gapTest is the parameter indicating the match in the waveform of the signal from the present channel and the signal from a firing adjacent channel, if present (described below).

As electron and hole recombination rates are negligible for Si(Li) and HPGe detectors, an equal number of electrons and holes are expected to be collected on the opposite sides of a DSSD (the AC and DC sides). As a result, the pulse amplitudes will be similar on both sides. This discussion arbitrarily assumes the use the AC segments to determine the x-coordinate of the interaction, and the DC segments to determine the y-coordinate.

The segments are matched according to the proximity of the energy between firing segments on opposite electrodes. The matching process contains several successive steps. A first step of the algorithm attempts to match a single firing segment on one electrode with a single firing segment on the opposite electrode (1-1 matches). Afterwards, the remaining firing segments are checked as the sum of energies of any two firing segments on one electrode against one firing segment on the other electrode (2-1 and 1-2 matches). 1-2, 2-1 and 2-2 matches are either caused by a single interaction or two interactions. A single interaction may produce signals on two strips on the same side when the interaction occurs in the gap between two strips. If the two firing segments on an electrode are adjacent to each other, a model for a single interaction depositing energy in the two segments (which we term as charge sharing) is checked upon. In the third step the higher multiplicity matches are analyzed (the 2-2, 3-2, 2-3, 1-3, 3-1 matches).

For each assumed match, a matching likelihood $P_{kl}$ is calculated to include probabilities for each segment firing to contain an interaction consistent with the assumed model ($P_k$ and $P_l$). A match is adopted if the calculated likelihood is above a certain threshold. For 1-1 matches, the match probability becomes:

$$P_{kl} = \frac{1}{\sigma\sqrt{2\pi}} e^{\frac{-(E_k - E_l)^2}{\sigma^2}} P_k P_l, \qquad (1)$$

In this case, $P_k$ and $P_l$ represent the probability that the firing segments have fired because of a single interaction, as opposed to multiple interactions. $E_k$ and $E_l$ are the energies of the two segments, and $\sigma$ is the equivalent standard deviation of the measured energies.

For 1-2 or 2-1 matches, if the 2 firing segments on the same electrode are non-adjacent, the assumed model accounts for 2 separate interactions depositing energy in a single segment on one side and in two segments on the other side. The probability for the match becomes:

$$P_{kl,2l} = \frac{1}{\sigma\sqrt{2\pi}} e^{\frac{-\left(E_k - \sum_{l1,l2} E_{l1,l2}\right)^2}{\sigma^2}} P_{k,2l} P_{(l1,l2),2l}. \qquad (2)$$

The term $P_{k,2l}$ accounts for the probability of two interactions inducing the signal in segment k. The term $P_{(l1,l2),2l}$ accounts for the probability of one interaction in segment l1 and one interaction in segment l2.

If a single interaction is assumed to produce a charge-sharing instance, the probability is defined as:

$$P_{kl,CS} = \frac{1}{\sigma\sqrt{2\pi}} e^{\frac{-\left(E_k - \sum_{l1,l2} E_{l1,l2}\right)^2}{\sigma^2}} P_k P_{(l1,l2),CS}. \qquad (3)$$

The term $P_{(l1,l2),CS}$ represents the probability for the signal waveforms of two adjacent segments l1 and l2 to have been produced by a single interaction in a charge sharing interaction. One alternative to this model is a case of two separate interactions. Such a model is checked upon by equation (2). Calculation of the probability term $P_{(l1,l2),CS}$ is described below under the description of the "gap test".

If no information exists to support the calculation of the $P_{(l1,l2),CS}$, $P_{(l1,l2),2l}$, $P_l$ and $P_k$ terms, the match is made by simply taking the minimum value for the quadratic difference between the segment energies:

$$\xi_{kl} = \frac{(E_k - E_l)^2}{\sigma^2}. \qquad (4)$$

A match is accepted only if the overall likelihood is above a preset threshold.

Z Interpolation, Event Time Determination

An analysis of the signal waveforms is used to determine the position of the interaction within the detector thickness (z-interpolation). This is made possible by measuring the time difference between the moments the electrons and holes arrive at the electrodes. This time difference will represent the charge carriers relative drift time, which is proportional to the depth of interaction.

Event Timing

The determination of the absolute event timing is important for the z-interpolation when the arriving time for one type of the carriers cannot be accurately measured. This is the case for the 2-1, 1-2, 3-1, 1-3 matches. Whenever two or more signal components superpose in the total signal waveform, no reliable determination of the two arrival times can be made using simple filters. However, if the absolute event time is known from a previous segment match, using only the arrival time for the clean signal, the depth of interaction can be calculated.

The charge carrier arrival time is represented by the T50 timing. The T50 timing is the time when the pulse reaches 50% of its total amplitude. A digital filter designed to fit in the data acquisition system provides the T50 timing. T50 is used as the time pick-off because the timing at 50% of the pulse amplitude in a segmented planar Ge detector is very close to the point of the steepest slope of the signal leading edge, where the best time resolution can be achieved. The T50 timing is a good measure for the charge carrier collection time because the largest electric current induced in the electrodes is proportional to the weighting fields, $E_w$, of the collecting electrode, $$I(t) = \sum_{cc=e,h} q v_{cc}(t) E_w(r_{cc}(t)), \qquad (5)$$

where q is the electric charge of the carriers, $v_{cc}(t)$ is their drift velocity, $r_{cc}(t)$ is their position, and cc stands for charge carriers-electrons, e, and holes, h, and because of the small dimension of the electrodes as compared with the detector thickness, the highest values for the weighting fields take place in the close proximity to the electrode. Since the charge signal is an integral over the current $$Q(t) = \int_{-\infty}^{t} I(t) dt,$$

the largest variation takes place when the current is largest.

Z-Interpolation

The arrival time for the electrons and holes is used to deduce the relative drift time, and through that, the depth of interaction. Since the electric fields inside the planar detector of about 1000V/cm are close to the saturation in the drift velocity for both electrons and holes, in a first approximation, one can assume constant drift velocities for the charge carriers in the range of electric fields existing in the detector, so a linear function can approximated the relation between the depth of interaction, z, and the difference in collection times:

$$z = z_0 + k_z c(t_e - t_h), \quad (6)$$

where $t_e$ is the time when the electrons arrive at the electrode, $t_h$ is the time when the holes arrive at the electrode, $z_0$ is a constant which is close to the halfway point between the detector electrodes, the displacement which is due to the difference in the saturated drift velocities between holes and electrons, and $k_z$ is a proportionality factor. If no arrival time is known for one of the carriers, but the absolute event time $T_o$ is known, the following is used:

$$z = v_e(t_e - T_o), \quad (7)$$

or $$z = D - v_h(t_h - T_o), \quad (8)$$

where D is the detector thickness, $v_e$ is the effective saturation drift velocity for electrons, and $v_h$ is the effective saturation drift velocity for holes. $T_o$ can be determined from a previously identified 1-1 match.

Depending on the processing resources available, instead of using the linear interpolation presented above, we propose to use a look-up table containing depth positions z for various $(t_e - t_h)$ values for 1-1 matches. This approach allows for a more accurate interpolation, since no linear interpolation approximation is assumed. For subsequent 1-2 and 2-1 matches a 2D lookup table is created containing depth positions z for each interaction in the 2-1 match for various z depth values identified in a previous 1-1 match, and $(t_{h,i} - t_h)$. A similar look-up table will be created for 2-1 matches, by making a table of z depth values for each interaction for various z depth values identified in a previous 1-1 match, and $(t_{e,i} - t_e)$.

A more accurate analytic interpolation method for 1-1 matches is a cubic interpolation. Such an interpolation fits much better the dependency of the depth z versus dT50 than a linear interpolation (see FIG. 6).

Besides the fact that charge carriers drift velocities are not constant across the detector width, another factor contributing to a non-linear interpolation function is the use of the T50 timing to represent the charge carrier collection time. This is an approximation which becomes coarse for interactions taking place close to the detector electrodes, because of the superposition of strong signals induced by both the electron and hole components.

Figure 7:
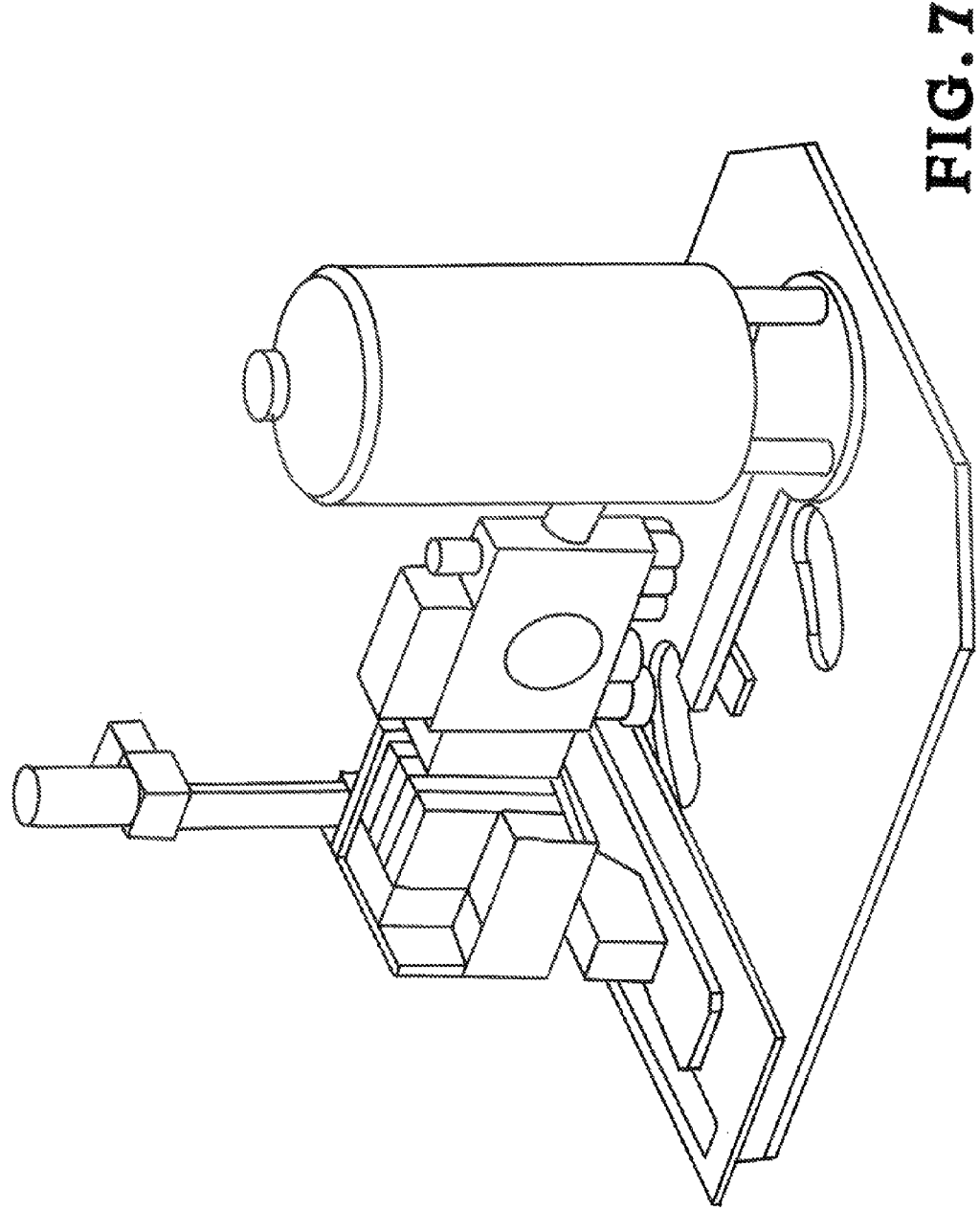
FIG. 7 shows a 3D view of an experimental apparatus for measuring Z-depth.

Side scanning measurements have been performed to calibrate the z-interpolation (see FIG. 7). A cubic interpolation provided a very good fit for the experimental points (see FIG. 6).

X-Y Interpolation

The positions of the interactions in the x-and y-directions can be determined with a precision better than the one provided by the segmentation alone. As with the z-interpolation, this is done by analyzing the signal waveforms. The physical property, which allows for interpolating positions within the segment's borders is the fact that the amplitude of the transient signals induced in segments adjacent to the Collecting segment falls approximately exponentially with the distance to their borders. Therefore, by observing the difference in the amplitude norm of the transient signals in the two adjacent segments, information can be obtained about the position of the interaction relative to the segment's border.

X-Y interpolation requires a new filter which extracts the amplitude norm of the transient signals in adjacent segments synchronous in time with the 50% crossing of the pulse in the collecting segments (T50). A moving average filter with a time constant of 50 ns was used to cut-off some of the high-frequency noise. The calculation of the amplitude as the transient amplitude norm, (TAN) is done as following:

$$TAN = \sqrt{\sum_{i=n1}^{n2} S_i^2} - \sigma\sqrt{n2 - n1}, \quad (9)$$

where $S_i$ is the waveform sample amplitude, n1 and n2 represent the indices indicating the waveform window over which the amplitude norm is calculated. The indices are represented in respect to the T50 timing sample index.

Further, to insure positive values after correcting for variance, $$TAN = \max(TAN, 1). \quad (10)$$

Once having measured the two amplitudes $TAN_{left}$ and $TAN_{right}$ of the two segments adjacent to the firing one, left and right, their ratio, R is:

$$R = \frac{TAN_{right}}{TAN_{left}}. \quad (11)$$

The interpolated position in the direction perpendicular to the direction of the strips is calculated as:

$$r = PitchSize\left(\frac{2\arctg(R^\beta)}{\pi} - \frac{1}{2}\right), \quad (12)$$

where the exponent $\beta$ is used to change the slope of the interpolation curve, and has to be optimized for each individual detector.

According to the recent experimental results, this interpolation provides a much more accurate representation of the interpolated position than a previous approach which only assumed a linear interpolation formula.

Identification of Charge-Shared Interactions

Figure 12:
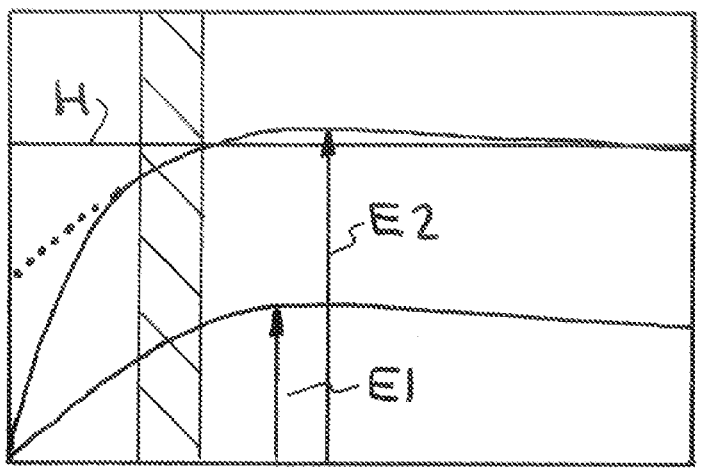
FIG. 12 shows signals induced in a charge sharing interaction taking place close to the collecting electrode.

Charge sharing is the process by which the charge carriers produced by a single interaction are collected by two adjacent electrodes. It is important to identify such interactions in order to discriminate them from cases when multiple interactions induce signals in adjacent segments. For example, in FIG. 12, we see two different 2-1 events-one produced by a single interaction with charge sharing and one by two interactions. It is important to correctly identify which process produced these signals to correctly image the gamma-ray.

The predominance of the charge sharing interactions is determined by the extension of their charge carrier clouds. The initial dimensions of these clouds are determined by the path of the Compton-electrons or photoelectrons in the detection material. During the drift toward electrodes, the clouds are further enlarged by the thermal diffusion, electrostatic repulsion between charge carriers, and other inelastic scattering mechanisms inside the crystal lattice.

Figure 13:
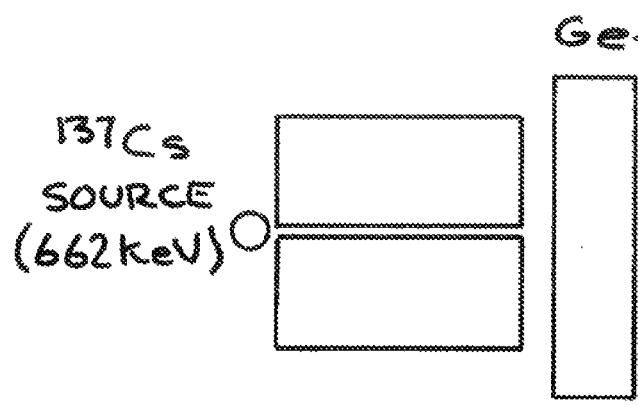
FIG. 13 is an experimental setup to study charge sharing interactions.

The diffusion coefficient for electrons and holes $D_{e,h}$ is:

$$D_{e,h} = \frac{k_B T}{e} \mu_{e,h} \quad (13)$$

where $k_B$ is Boltzman's constant, $\mu_{e,h}$ is the electron and hole mobility, T is the temperature of the crystal, e is the electron's charge. The evolution of the charge carrier cloud during their drift towards the electrodes as determined by the diffusion is represented in FIG. 13.

If the probability for an interaction to share charges between two electrodes is p, the expected fraction of events of N interactions that contain a number n of charge-shared interactions is found by the binomial distribution:

$$P(n,T) = C_n^T p^n (1-p)^{T-n}, \quad (14)$$

where p is the probability for the occurrence of a charge sharing case, $C_n^T$ is the combination of T elements taken n times, and T is the number of trials. In the present case, the number of trials, T=2N, where N is the number of interactions (each interaction in a DSSD will create two chances for charge sharing, one for the AC segments, one for DC segments). The probability for at least a charge sharing case in an N interaction event is the sum of all probabilities that 1, 2, . . . , 2N charge sharing cases will occur:

$$P(n \geq 1, 2N) = P(1, 2N) + P(2, 2N) + \ldots = 1 - P(0, 2N) \quad (15)$$

That is:

$$P = 1 - (1-p)^{2N}.$$

Example 1: p=15%, N=3; P=62%. Example 2: p=20%, N=4; P=83%.

This high probability for at least a charge sharing instance in any given event suggests that charge sharing is a very important factor in the event selection process, and needs to be accounted for.

Figure 10:
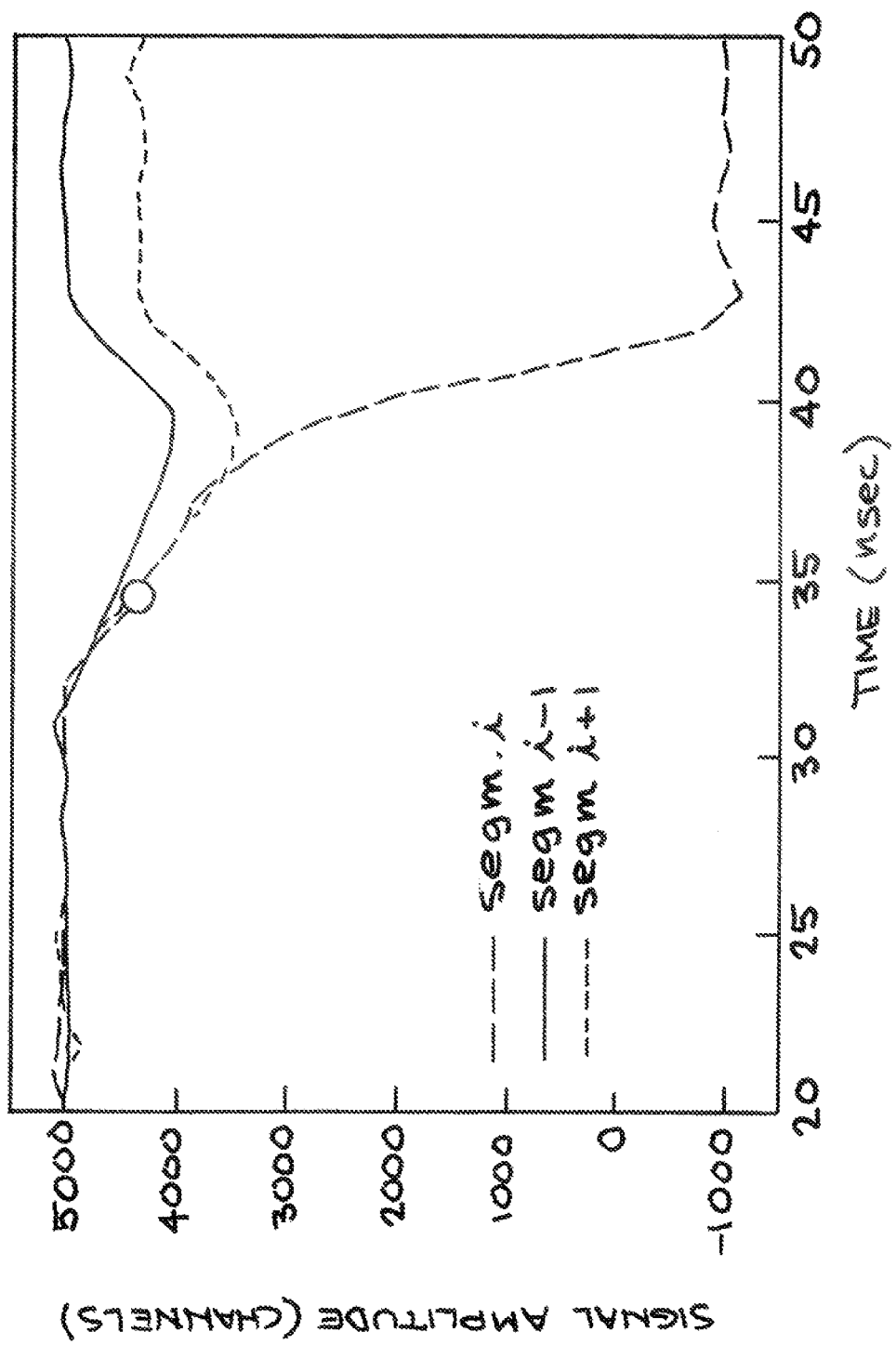
FIG. 10 is an example of signal waveforms produced by a charge sharing interaction where the time interval represents the gap-test interval.

The signals induced by a charge sharing interaction in the two adjacent segments have the same shape within a certain time interval. This is a significant feature that is used to discriminate such interactions. The similarity of shapes can be explained by the fact that at the border between two segments, the charge cloud path goes through similar weighting fields associated with the two segments. An example of induced signals is shown in FIG. 10.

Gap Test Version 1

Candidates for charge sharing interactions are the (2-1) trigger patterns, with the two adjacent firing segments on one side. For such cases, it is hypothesized that the case is a charge sharing interaction. A Chi square hypothesis test is used to check this hypothesis.

$$\chi^2 = \frac{\sum_{i=sl}^{sr} (s_{1i} - m_i)^2}{\sigma_{s_{1i}}^2} + \frac{\sum_{i=sl}^{sr} (s_{2i} - m_i)^2}{\sigma_{s_{2i}}^2}, \quad (16)$$

where $s_{1i}$ is the sample amplitude of the first waveform, $s_{2i}$ is the sample amplitude of the second waveform, $\sigma_{s_{1i}}$ and $\sigma_{s_{2i}}$ are the sample standard deviations for the first waveform, and the second waveform, respectively. The sums run over a waveform segment starting with sample index sl and ending with the sample index sr as determined in respect to the sample closest to the point where the leading edge passes a low level threshold. $m_i$ is a model for the sample of index i. For a charge shared event, we expect to have identical signal waveforms within the specified time interval. The model $m_i$ we choose is the average of the two waveforms:

$$m_i = \frac{s_{1i} + s_{2i}}{2}. \quad (17)$$

If the sample standard deviation is the same for all samples of the two waveforms, then $$\sigma_{s_{1i}} = \sigma_{s_{2i}} = \sigma. \quad (18)$$

The estimation of the sample standard deviation is done using a region of the signal that does not contain pulses, but only noise:

$$\sigma = \sqrt{\frac{1}{N} \sum_{i=1}^{N} (s_i - \bar{s})^2}. \quad (19)$$

As a result, the gap test based on the Chi square test becomes:

$$gapTest = \frac{\sum_{i=sl}^{sr} (s_{1i} - s_{2i})^2}{\sigma^2}. \quad (20)$$

If the hypothesis is correct (i.e., the signals are from a single sharge-shared interaction), the variation in the $s_{ji}$ samples is expected to follow a normal distribution. Thus, the gapTest distribution will be a chi-square distribution. For a certain significance level, $\alpha$ to accept the hypothesis, an upper threshold for gapTest will be chosen from the critical value of the Chi square distribution:

$$gapTest < x_\alpha(\chi_N^2), \quad (21)$$

here N is the number of degrees of freedom.

As described below, this first version of a gap test has been tested with experimental data and found to identify only a part of charge-shared events.

Gap Test Version 2

As described above, waveforms have similar shape when the charge carriers drift relatively far from the collecting electrode. As a result, the first version of our gap test algorithm produced good results for interactions taking place far from the collecting electrodes, but could not identify the charge shared interactions taking place close to the electrodes (see FIG. 15).

When the interaction takes place near the collecting segments, the signal waveforms from the two strips are very different from each other in the signal window used by the first version of the algorithm. In such a case, the waveforms will have a similar shape only toward the tail of the pulse leading edge, and then, there will be an off-set in amplitude determined by the difference in the pulse amplitudes of the two segments.

In order to identify near-electrode charge sharing interactions, the position of the window will be moved, and a correction has to be made for the difference in the amplitude between the two waveforms. Therefore, a two-step test is needed to identify both types of charge sharing interactions.

Another change in the gaptest formula as compared with the first algorithm is the introduction of a $kE_{max}$ term. This term will relax the assumed standard deviation $\sigma$ so that, in the case when the waveforms signal to noise ratio is large (as it will be at high energies), the relatively small differences between the two waveforms due to the slightly different weighting fields associated with the two segments will not be reflected in the chi-squared test.

Figure 15:
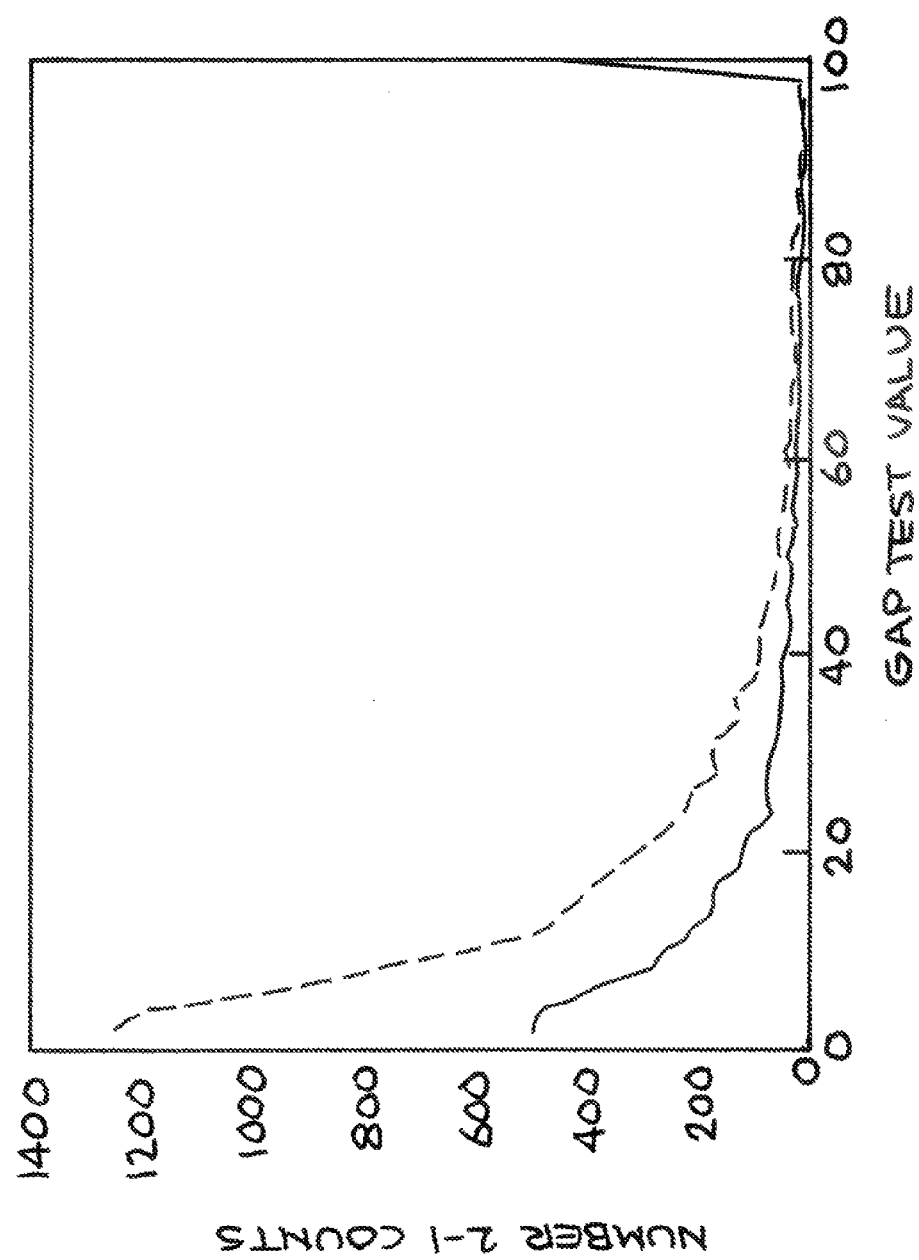
FIG. 15 is a histogram of gapTest values using gap test version 2.

With this modification, the first step in the gap test (to identify charge sharing interactions far away from the collecting electrode is:

$$gapTest1 = \frac{\sum_{i=L}^{L+W}(S_{1i} - S_{2i})^2}{\sigma^2 + (kE_{max})^2} \quad (22)$$

and is applied to the time window shown in FIG. 15, which starts when the pulse amplitudes exceed a low-level threshold L (typically set at 3 times σ to avoid triggering this test on noise).

The second step in the gap test (to identify near-electrode charge sharing interactions) must include a correction for the pulse amplitudes E1 and E2, and thus is:

$$gapTest2 = \frac{\sum_{i=H-W}^{H}(S_{1i} - S_{2i} + E_2 - E_1)^2}{\sigma^2 + (kE_{max})^2} \quad (23)$$

where the time window ends when one of the pulses exceeds an upper-level threshold H, typically 3 to 4 times σ below the total pulse amplitude.

By selecting the minimum of these two values:

gapTest=min(gapTest1,gapTest2)  (24)

we can apply the same hypothesis test as was discussed for the version 1 of the gap test (equation (23)).

Gap Test Experimental Results

Figure 14:
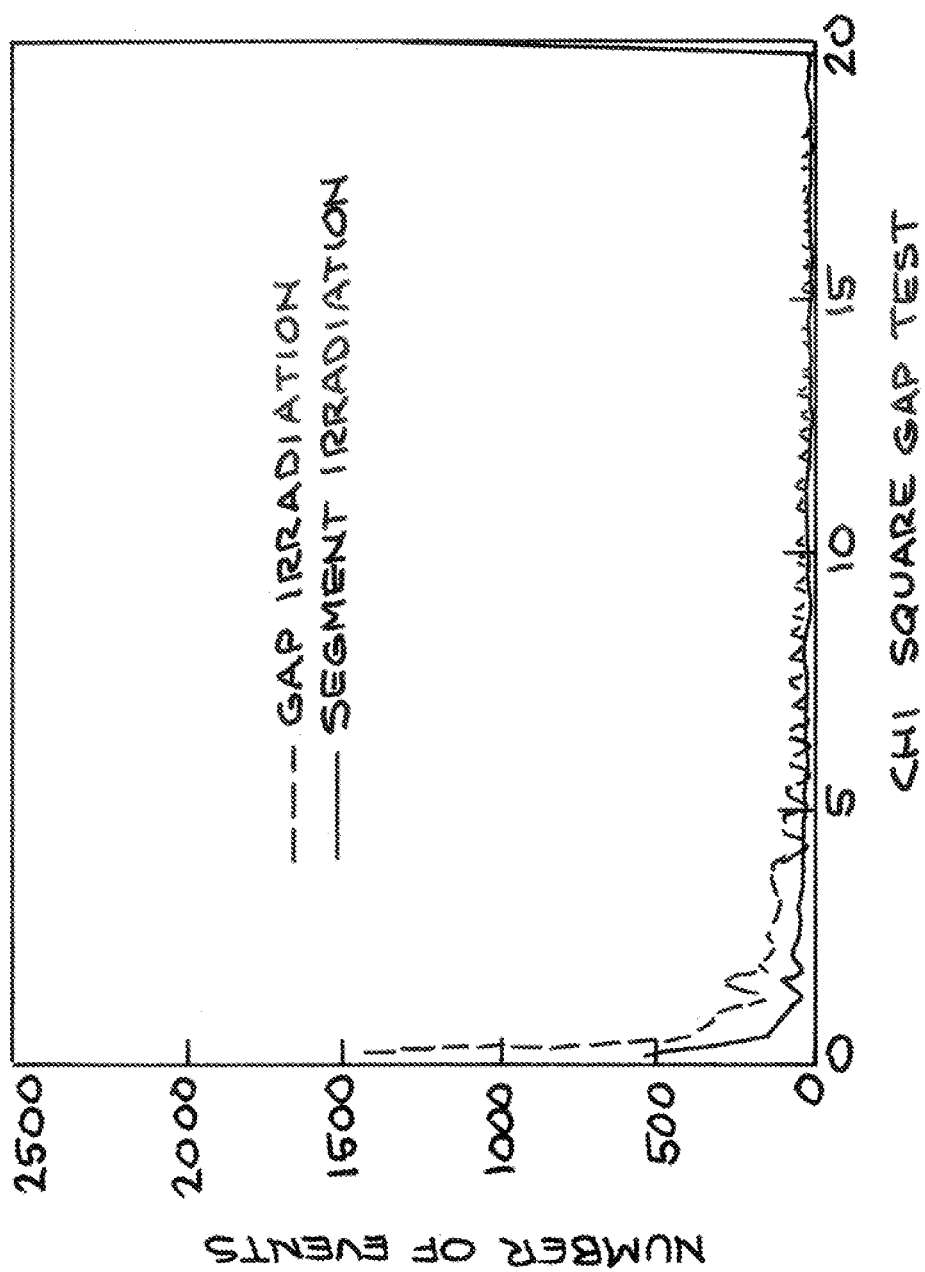
FIG. 14 is a histogram of gapTest values using gap test version 1.

The experimental setup pictured in FIG. 13 was used to check the gap test algorithms. The results are graphically shown in FIGS. 14 and 15. The 1 mm diameter collimated beam was centered in the gap between two segments. For firing adjacent segments, a chi-squared distribution is formed by the gapTest values.

The first version of the gap test algorithm shows that many of the 1-2 and 2-1 events can be found outside the chi square distribution. These are the events that are not recognized by the test to have similar waveforms, which would indicate the presence of multiple interactions. However, there is a very big difference in these numbers when moving the irradiation spot from the middle of the segment to the gap between two segments. Monte Carlo simulations would suggest only a 7% increase in the multiplicity of 1-2 events when changing the irradiation spot from the middle of the segment into the gap, whereas the experimental results show a factor of 2 increase. Clearly, this test is not complete, failing to recognize some of the charge sharing interactions.

The gap test version 2, by comparison with the first version, provides much more consistent results. The difference between the numbers of 1-2 events outside the chi square distribution varies by a factor of 20%, between the two irradiation points, much closer to the 7% expected from Monte Carlo simulations. Higher amplitudes have been obtained for the chi square distribution when the irradiation of the detector takes place in the gap between segments, than in the middle of the segment. This is in agreement with a higher charge sharing probability when the interactions take place in close proximity to the gap between segments.

A larger number of adjacent 1-2 (1x-2y) events than 2-1 (2x-1y) events has been noticed. This might be explained by different effective diffusion coefficients for the electrons and holes.

A digital computer system can be programmed to perform the method of this invention. Once programmed to perform particular functions pursuant to instructions from program software that implements the method of this invention, such digital computer system in effect becomes a special-purpose computer particular to the method of this invention. The techniques necessary for this are well-known to those skilled in the art of computer systems.

Computer programs implementing the method of this invention will commonly be distributed to users on a distribution medium such as floppy disk or CD-ROM. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The term "computer-readable medium" encompasses distribution media, intermediate storage media, execution memory of a computer, and any other medium or device capable of storing for later reading by a computer a computer program implementing the method of this invention.

References

[Amma-00] M. Amman, P. N. Luke, "Three-dimensional position sensing and field shaping in orthogonal-strip germanium gamma-ray detectors", Nucl. Instr. Meth. A, 452 (1-2), pp. 155-166, 2000.

[Amro-03] S. Amrose, S. E. Boggs, W. Coburn, R. P. Lin and D. M. Smith "Calibration of 3D positioning in a Ge cross-strip detector", NIM-A, Volume 505, Issues 1-2, 1 Jun. 2003, Pages 170-173.

[Hull-01] Hull, E. L. et al., SPIE Proceedings, Bellingham Wash., 4507, 2001.

[Luke-92] Luke, P. N., Cork C. P, Madden, N. W., et al., "Amorphous-Ge Bipolar Clocking Contacts on Ge Detectors", IEEE Trans. Nucl. Sci., 39, 590, 1992.

[Miha-05] L. Mihailescu, K. M. Vetter, M. T. Burks, E. L. Hull, W. W. Craig, "SPEIR: a Ge Compton camera" NIM-A, accepted for publication 2005.

[Wulf-03a] E. A. Wulf, J. Ampe, W. N. Johnson, R. A. Kroeger, J. D. Kurfess and B. F. Phlips "Timing methods for depth determination in germanium strip detectors", NIM-A, Volume 505, Issues 1-2, 1 Jun. 2003, Pages 178-182.

All documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A system, comprising:
   means for collecting data from an electrode segment or electrode segments of a double-sided segmented detector (DSSD);
   means for calculating, using said data, a 3 dimensional position for each of a plurality of gamma-ray photon interactions in said DSSD, wherein said means for calculating a 3 dimensional position is configured for energy matching of a "2-1" segment-to-segment configuration, wherein said means for calculating a 3 dimensional position is configured for performing a GapTest for a first segment and a second segment that are adjacent; and
   means for producing a list of each said 3 dimensional position for each interaction of said plurality of gamma-ray photon interactions.

2. The system of claim 1, wherein said means for collecting data is configured for determining which segment of said DSSD has collected a charge carrier.

3. The system of claim 1, wherein said means for collecting data is configured for determining the amount of energy collected in a segment of said DSSD.

4. The system of claim 1, wherein said means for collecting data is configured for determining the time at which a charge carrier arrives at a segment of said DSSD.

5. The system of claim 1, wherein said means for collecting data is configured for determining the amplitude of the energy collected in a segment adjacent to a segment of said DSSD that has collected a charge carrier.

6. The system of claim 1, wherein said means for collecting data is configured for collecting energy waveform data from adjacent segments of said DSSD.

7. The system of claim 1, wherein said means for collecting data is configured for performing at least one step selected from the group consisting of (i) determining which segment of said. DSSD has collected a charge carrier, (ii) determining an amount of energy collected in a segment of said DSSD, (iii) determining a time at which a charge carrier arrives at a segment of said DSSD, (iv) determining an amplitude of energy collected in a segment adjacent to a segment of said DSSD that has collected a charge carrier and (v) collecting energy waveform data from adjacent segments of said DSSD.

8. The system of claim 1, wherein said means for collecting data is configured for (i) determining which segment of said DSSD has collected a charge carrier, (ii) determining an amount of energy collected in a segment of said DSSD, (iii) determining a time at which a charge carrier arrives at a segment of said DSSD, (iv) determining an amplitude of energy collected in a segment adjacent to a segment of said DSSD that has collected a charge carrier and (v) collecting energy waveform data from adjacent segments of said DSSD.

9. The system of claim 1, wherein said means for calculating a 3 dimensional position is configured for energy matching of a "1-1" segment-to-segment configuration.

10. The system of claim 1, wherein said means for calculating a 3 dimensional position is configured for interpolating z- and x-y-interaction position coordinates.

11. The system of claim 10, wherein said means for calculating a 3 dimensional position is configured for using said z- and x-y-interaction position coordinates to determine the position of a single interaction.

12. The system of claim 1, wherein said means for calculating a 3 dimensional position is configured for checking event integrity to verify that the sum of the energies of all identified interactions is consistent with the total energy deposited in said DSSD.

13. The system of claim 1, wherein when a plurality of photons produce a plurality of interactions, said means for calculating a 3 dimensional position is configured for calculating and making a list of said position for each interaction of said plurality of interactions, the apparatus further configured for creating a representation of a gamma-ray image from said list.

14. An system, comprising:
    means for collecting gamma-ray photon interaction produced data from an electrode segment or electrode segments of a double-sided segmented detector (DSSD); and
    means for calculating, using said data, a 3 dimensional position of said gamma-ray photon interaction in said DSSD, wherein said means for calculating a 3 dimensional position is configured for energy matching of a "3-1" segment-to-segment configuration, wherein said means for calculating a 3 dimensional position is configured for performing a GapTest on said "3-1" segment-to-segment configuration.

15. The system of claim 14, wherein said means for calculating a 3 dimensional position is configured for a second step of interpolating z- and x-y-interaction position coordinates.

16. The system of claim 15, wherein said means for calculating a 3 dimensional position is configured for using the results of said second step of interpolating z- and x-y-interaction position coordinates to determine the position of a single interaction.

* * * * *